Oct. 20, 1953 D. H. GRIDLEY ET AL 2,656,524
DATA STORAGE AND REPRODUCING APPARATUS
Filed Aug. 9, 1949 7 Sheets-Sheet 1
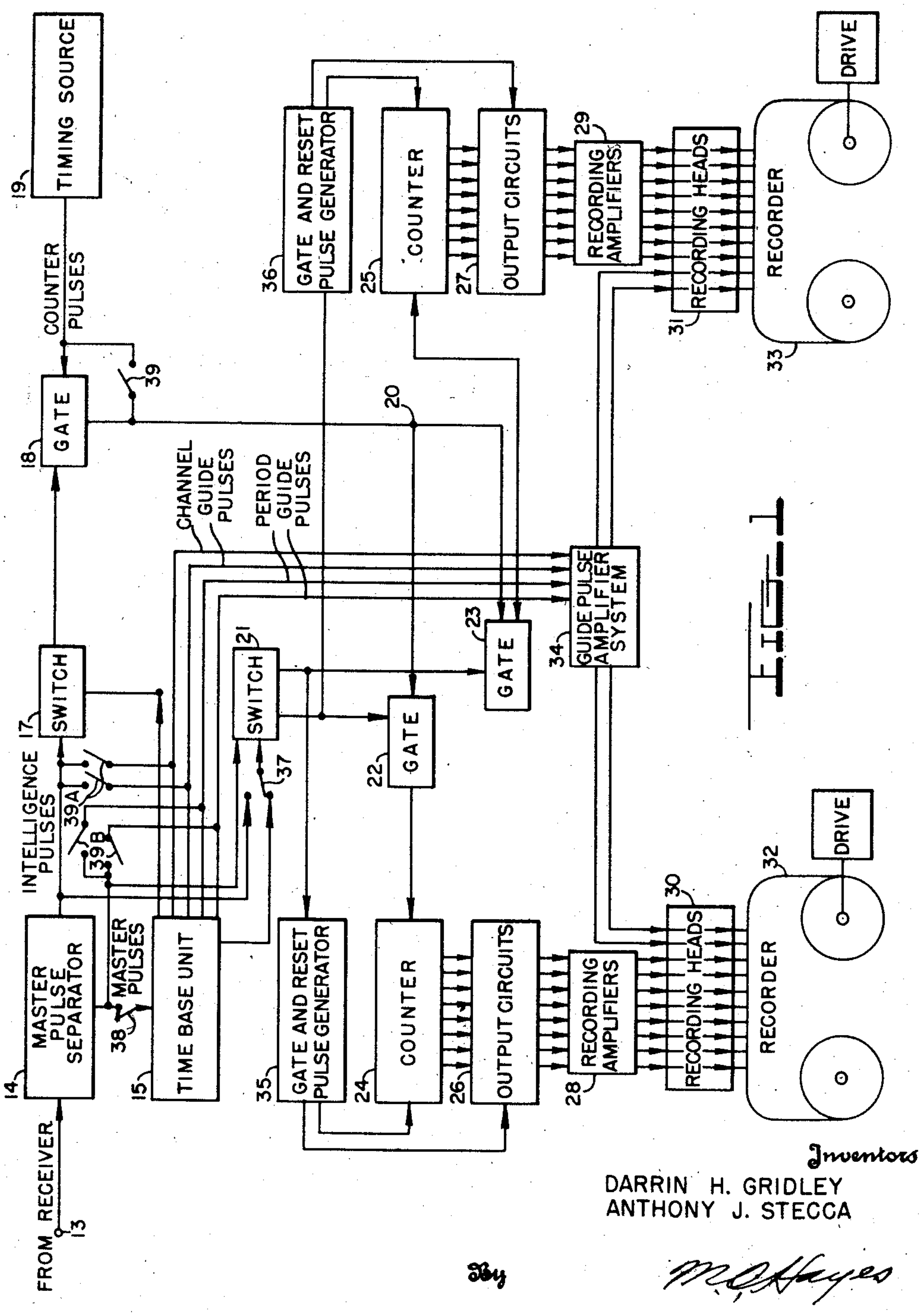
Inventors
DARRIN H. GRIDLEY
ANTHONY J. STECCA
By M. A. Hayes
ATTORNEY Oct. 20, 1953 D. H. GRIDLEY ET AL 2,656,524

DATA STORAGE AND REPRODUCING APPARATUS

Filed Aug. 9, 1949 7 Sheets-Sheet 2

Inventors
DARRIN H. GRIDLEY
ANTHONY J. STECCA

By M. A. Hayes

ATTORNEY

Inventors
DARRIN H. GRIDLEY
ANTHONY J. STECCA

By M. A. Hayes

ATTORNEY

DATA STORAGE AND REPRODUCING APPARATUS

Filed Aug. 9, 1949 7 Sheets-Sheet 4

Inventors
DARRIN H. GRIDLEY
ANTHONY J. STECCA

By M. A. Hayes

ATTORNEY

Inventors
DARRIN H. GRIDLEY
ANTHONY J. STECCA

By M. C. Hayes

ATTORNEY

Oct. 20, 1953 D. H. GRIDLEY ET AL 2,656,524
DATA STORAGE AND REPRODUCING APPARATUS
Filed Aug. 9, 1949 7 Sheets-Sheet 6
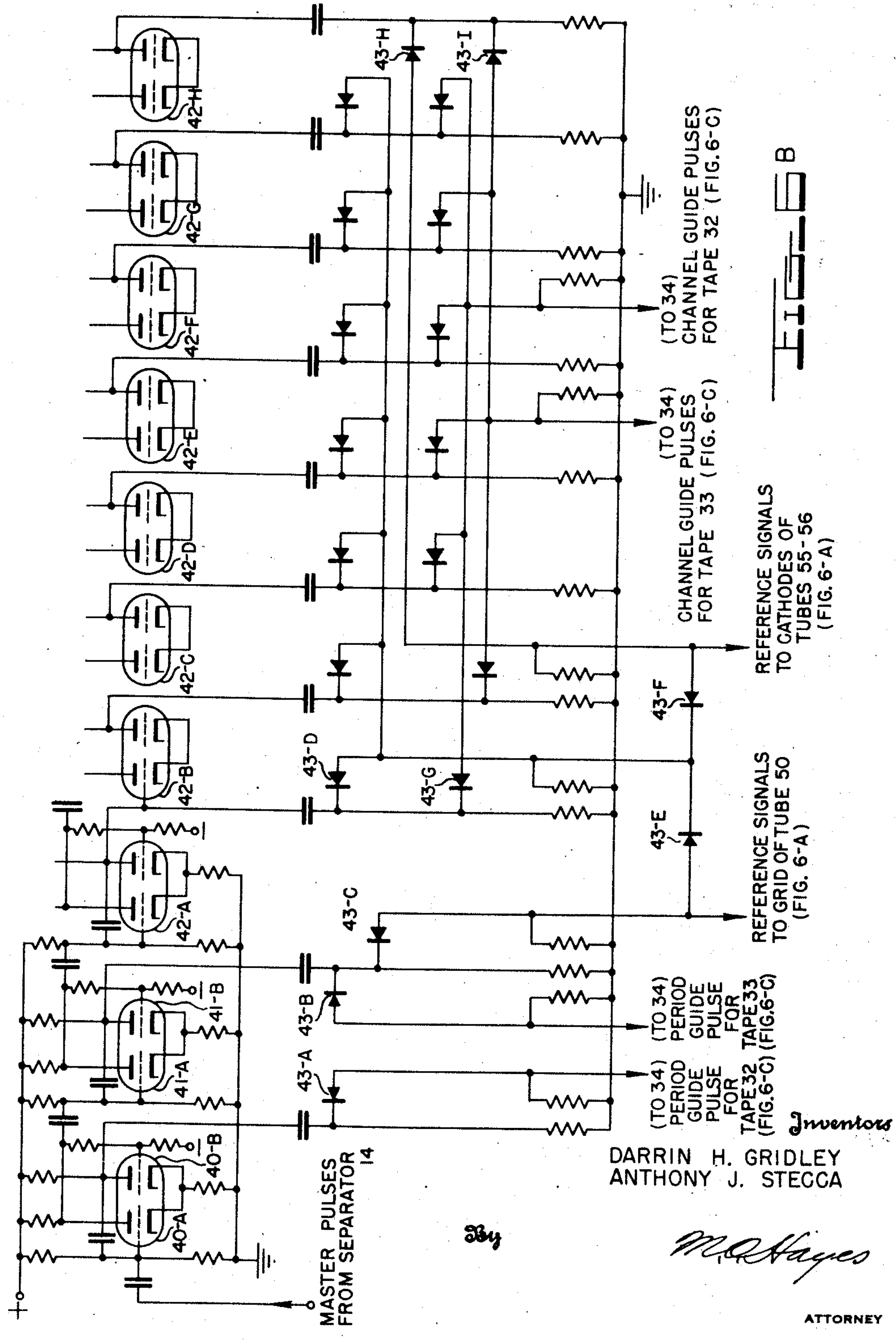
FIG. 6-B
Inventors
DARRIN H. GRIDLEY
ANTHONY J. STECCA
By M. A. Hayes
ATTORNEY

DATA STORAGE AND REPRODUCING APPARATUS

Filed Aug. 9, 1949 7 Sheets-Sheet 7

Inventors
DARRIN H. GRIDLEY
ANTHONY J. STECCA

By

M. A. Hayes
ATTORNEY

Patented Oct. 20, 1953

2,656,524

UNITED STATES PATENT OFFICE 2,656,524

DATA STORAGE AND REPRODUCING APPARATUS

Darrin H. Gridley and Anthony J. Stecca, Washington, D. C.

Application August 9, 1949, Serial No. 109,385

17 Claims. (Cl. 340—206)

(Granted under Title 35, U. S. Code (1952), sec. 266)

This invention relates to multiplex information conveying systems and in particular to receiving equipment for recording and reproducing information relative to a plurality of variable quantities at a remote locality.

In many applications where measurements and tests must be made, typically in test flights of experimental aircraft or of expendable missiles, it is necessary to derive information relative to a plurality of variable quantities and to record that information in such a manner that it may be preserved. Since the device being tested is not always recoverable intact, this recording of information must frequently be done at a point remote with respect thereto. In such a situation, a radio intelligence system becomes of primary interest because thereby it is possible to automatically derive and relay information from the typical aircraft to a ground station where the information may be safely and permanently recorded for playback as needed. For the typical test flight of an aircraft, it is generally necessary to derive and transmit for recording, information relative to a plurality of quantities simultaneously or in rapid sequence because all parts of the test apparatus are simultaneously subjected to operational stresses and strains. To thus deliver and record multiple information it is necessary to employ a plurality of transmitter, receiver and recorder units, one for each variable quantity or to employ a single transmitter, receiver, and recorder for all variables and add thereto suitable multiplex equipment. Where many variables such as 8 or more are involved, the power, space, and weight requirements for separate transmitters for each quantity can become considerable, hence a multiplexing scheme employing single units at each step with controlled time sharing between the variable quantities offers numerous advantages. Typically to discuss operation in round numbers the sampling could be accomplished in a multiplex manner such as to provide, with a single transmitter and receiver, channels for 8 variables each of which would be sampled at a rate of 1000 times per second. It is not particularly difficult to provide a transmitter multiplex system which will derive and deliver information at this rate, however, the problem of recording so much information at the ground station in a manner permitting accurate playback and evaluation thereof is quite another story. The information must be recorded with a high degree of accuracy and in a manner that will make it readily available for automatic insertion in calculation equipment because of the sheer magnitude of the information received. In the typical example of 8 channels each sampled 1000 times a second, 8,000 distinct bits of information are secured during each second of operation or 480,000 a minute. Merely the tabulation of such quantities of data by manpower is impractical.

Accordingly it is an object of the present invention to provide a method for multiplex receiving, recording and playback of information relative to a plurality of variable quantities.

Another object of the present invention is to provide a receiving system which will receive and accurately record multiplex data.

Another object of the present invention is to provide a system for the playback of multiplex data.

Another object of the present invention is to provide a system for the resolution of multiplex data into a form readily usable by calculation equipment.

Other objects and features of the present invention will become apparent upon a careful consideration of the accompanying discussion and drawings in which:

Fig. 1 is a block diagram of a system for recording multiplex information of the character described above;

Fig. 2 is a block diagram of a playback system responsive to the recording obtained from the system of Fig. 1 to separate and individually deliver information relative to a single one of the variables in a usable form;

Figs. 6A, 6B, 6C show, partly in schematic form, particular details of certain components employed in the block diagrammed apparatus of Fig. 1.

Figures 6C, 7:
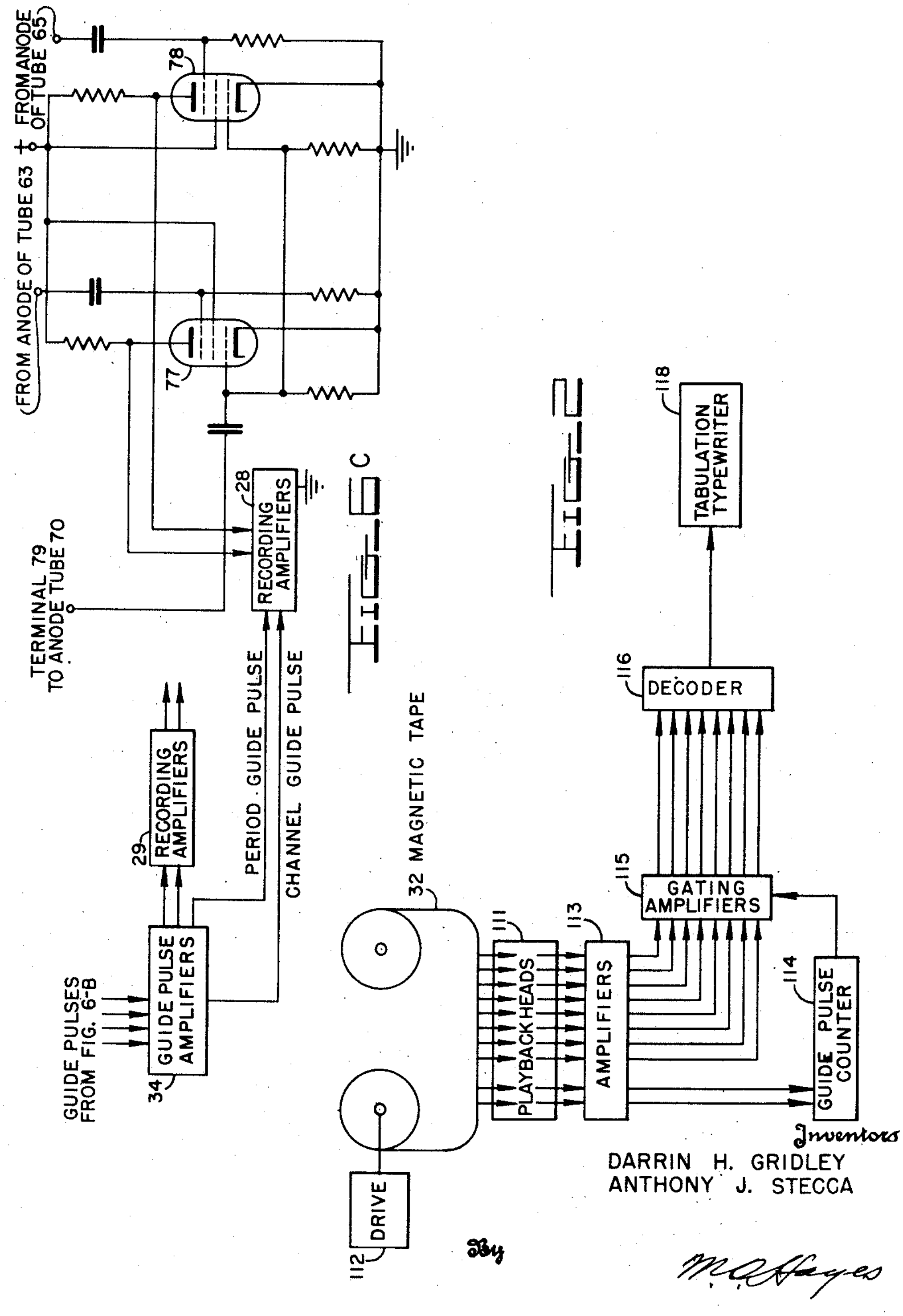

In accordance with the broad aspects of the present invention, a highly accurate multiplex recording and playback system is provided which is capable of receiving information regarding a plurality of variable quantities from a pulse position variation type multiplex transmitter and recording that information in such a manner that it may be accurately reproduced as originally derived or may be changed in form to deliver individually the information relative to a selected one of each of the variable quantities.

The specific examples of a system selected to conveniently illustrate and describe the invention require an information containing signal having selected specific characteristics. These specific characteristics are first typified by the waveform A of Fig. 3. This waveform represents a part of one series of a recurrent series of output pulse signals from a radio receiving system and contains a first master pulse 10, and subsequent intelligence conveying pulses 11, 12, one for each "channel" or variable quantity.

In particular this type of multiplex pulse transmission utilizes a series of movable channel intelligence pulses, typified by pulses 11 and 12, interleaved with a series of fixed time reference position pulses. The time displacement of each intelligence pulse with respect to its corresponding time reference position pulse is a measure of the intelligence or data carried by that particular channel.

For the purposes of economizing transmitter power the individual time reference position pulses are usually suppressed at the transmitter and a single synchronizing or master pulse 10 is transmitted in lieu thereof, one each cycle of transmission. For example if 8 channels are used with a 100 microsecond interval allocated to each channel the beginning of the pulse transmission cycle would be marked by the synchronizing signal 10. The first intelligence pulse would occur in the 100 to 200 microsecond interval following the synchronizing pulse, the second channel pulse in the interval between 200 and 300 microseconds and so on.

Since the time reference pulses are not transmitted the synchronizing pulse 10 is used to reestablish the same at the receiver by controlling the production of a time base which comprises a series of pulses separated by 100 microsecond intervals, each pulse marking the beginning of a different intelligence channel.

To reduce the time displacement of the individual intelligence pulses with respect to their corresponding time reference pulses to a numerical quantity easily handled by calculating machines and to record and store the information conveyed by the intelligence pulses, the present invention utilizes each locally generated time reference pulse to start the electronic counting of an accurately known timing signal and the individual intelligence channel pulses to stop the counting operation.

The timing wave is locally generated by an accurately controlled pulse source at the receiver and the counting operation is preferably performed by a conventional cascaded scale-of-two trigger circuit arrangement wherein the final state of the counter gives in binary form the number of timing pulses generated in the interval between each reference pulse and the corresponding intelligence pulse.

Figure 3:
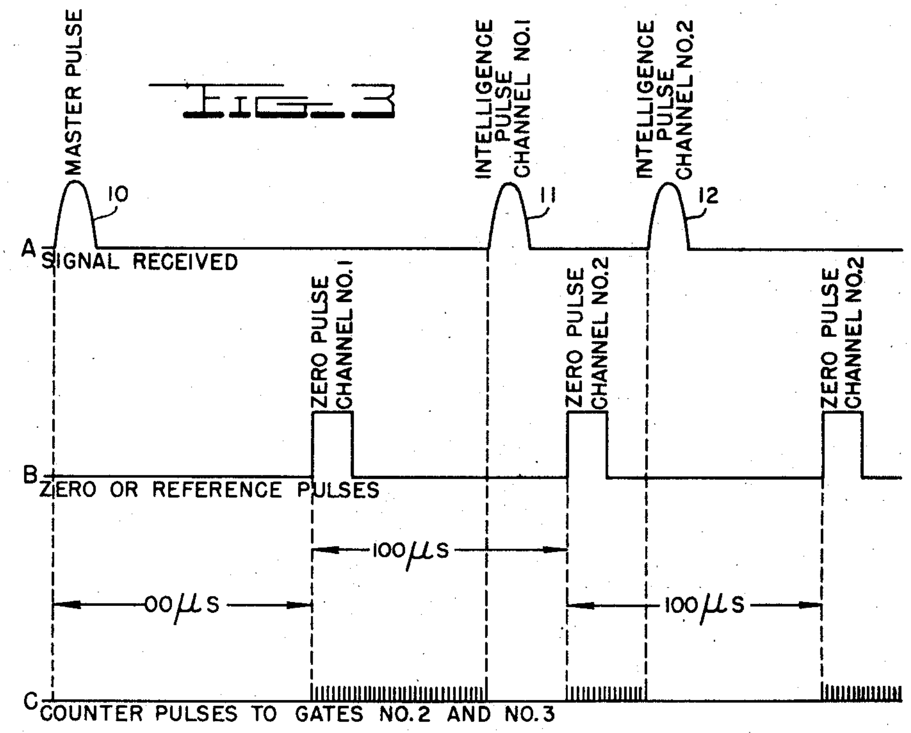
Figs. 3 and 4 show various waveforms taken to illustrate the operation of the apparatus of Figs. 1 and 2.

With reference now to Fig. 1 of the drawing, the pulse output signals from a suitable receiving system as illustrated by waveform A of Fig. 3 are applied to terminal 13. This input waveform shows only three signals which are suitable for conveying information relative to two variables at a given instant, however, in the typical system previously mentioned providing 8 channels each sampled 1,000 times a second, the recurrent waveform would comprise 9 pulse signals and would be repeated 1,000 times a second. The first master pulse signal 10 bears specific characteristics such as of duration or a time spacing from a preceding signal so that it is distinct from the intelligence pulses and may be identified and separated from the group by the master pulse separation unit 14.

In the following description the various switches 37, 38, 39, 39A and 39B of Fig. 1 will be considered set as follows:

Swith 37 down.
Swith 38 closed.
Switch 39 open.
Switches 39A open.
Switches 39B open.

The master pulses identified by the separator 14 are applied to the time base unit 15, which is operatively responsive to the master pulse 10 (Fig. 3) to produce a series of accurately spaced time reference pulse signals, one for each intelligence channel. Again in the typical example of 8 channels sampled 1,000 times a second, these reference pulse signals would be 8 in number spaced 100 microseconds apart as indicated in waveform B of Fig. 3.

The output from time base unit 15 is fed to an electronic scale-of-two switch 17 which controls the operation of a gated amplifier circuit 18. In one state of switch 17 gated amplifier circuit 18 is enabled to pass timing pulses fed thereto from timing source 19 and in the other state of switch 17 gated amplifier circuit 18 is blocked. Thus the gate 18 controls the application of timing pulses from timing source 19 to a second juncture terminal 20. Switch 17 also receives the channel intelligence pulses from the master pulse separation unit 14 and is initially arranged to permit delivery of a series of timing pulses through gated amplifier circuit 18 to terminal 20 coincident with the start of each reference pulse delivered thereto from time base unit 15 and to terminate each series of timing pulses coincident with the reception of a succedent channel intelligence pulse from master pulse separation unit 14.

Reference pulses from time base unit 15 are also supplied to a second electronic scale-of-two switch 21 which in turn alternately unblocks a pair of gated amplifiers 22 and 23 in an alternate manner so that counter pulses supplied to terminal 20 from timing source 19 through gate 18 will be delivered alternatively to two pulse counters 24 and 25. Thus one reference pulse of a particular series corresponding for example to channel 1 will direct the resulting series of timing pulses from timing source 19 to pulse counter 24 and then upon operation of switch 21 by a succeeding reference pulse for channel 2 of the series will direct the second series of counter pulses to pulse counter 25. Thus a time sharing will be effected between pulse counters 24 and 25 so that adequate time will be allowed for the counters to deliver their information to suitable recording apparatus and return to their reference states after receiving the timing pulses from timing source 19. Pulse counters 24 and 25 may be of any type suitable for operation at the frequencies involved. In the typical case previously referred to, the pulses delivered by timing source 19 could be of about 0.1 microsecond duration and occurring at 0.5 microsecond intervals. The pulse counters 24, 25 may then be standard eight-stage binary counters. Such eight-stage counters are capable of registering counts up to 255 however in a 100 microsecond channel period only 200 could occur. In operation of the counters each stage has two possible distinguishable states, and the combination of the two states for each of the eight stages provides the 255 possible binary combinations.

It is therefore possible to count the number of pulses from timing source 19 that occur during the interval of time between the reference pulse and the intelligence pulse for a given channel in each series to determine the duration of the time interval with an accuracy of ½ of one percent in the typical case.

Information relative to each stage of the eight stage counter is supplied individually from each counter stage through eight output circuits in each block 26, 27 to a corresponding number of recording amplifiers 28, 29 for recording on a suitable medium such as magnetic tape. To this end recording heads indicated by blocks 30, 31 each containing 10 recording heads are provided for recording the information on storage tapes 32, 33. Eight of the 10 recording heads are used to separately record the state of each of the 8 counter stages and two are used for purposes soon to become apparent.

In the recording operation switch 21 operates a pair of gate and reset pulse generators 35 and 36 in alternation which in turn energize the respective output circuits 26 and 27 to record the existant state of the respective pulse counters 24 and 25 and thereafter reset said counters to a reference state. By way of example, assume that the information conveyed by the intelligence pulse in channel 1 is contained in counter 24. Then as switch 21 is tripped by the reference pulse from time base unit 15 through switch 37, a pulse is also supplied from switch 21 through gate and reset pulse generator 35 to the output circuits 26 to cause the recording heads 30 to selectively magnetize portions of the storage tape 32 in accordance with the state of the individual counter stages. At this same instant switch 21 renders gated amplifier 23 operative to pass the pulses from timing source 19 to counter 25 where the information conveyed by the second channel may be stored. A short time after the application of a record signal from gate and reset pulse generator 35, a delay circuit in gate and reset pulse generator 35 delivers a signal to pulse counter 24 to cause the return thereof to a reference state after the channel intelligence recording so that the apparatus is clear to count for a subsequent channel 3.

To identify the information for the intelligence channels as recorded in the respective storage tapes 32 and 33 a guide pulse amplifier system 34 is provided. Guide pulse amplifier system 34 is energized from separate outputs from the time base unit 15 as hereinafter described. The energization is performed in such a manner that a period guide pulse is placed on storage tape 32 each time the information contained in channel 1 is recorded and on storage tape 33 each time the information from channel 2 is recorded. Guide pulse amplifier system 34 further supplies a channel guide signal for each channel which is recorded on storage tapes 32 and 33. The period and channel guide pulses are separately recorded by the remaining two recording heads contained in each of the blocks 30 and 31.

Figure 5:
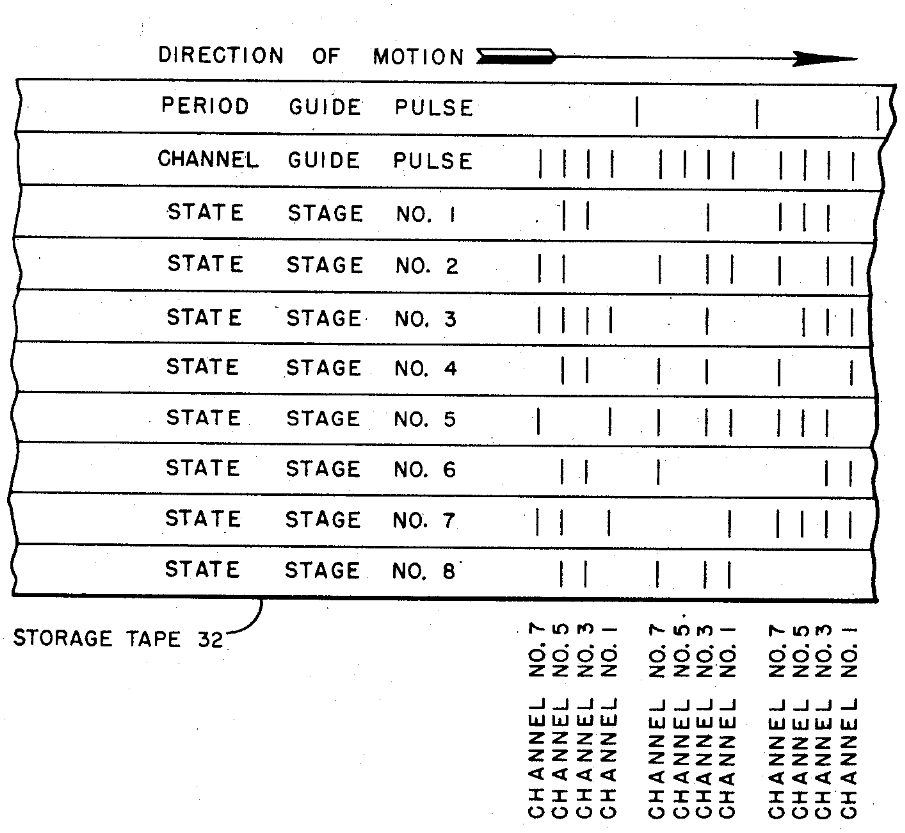
Fig. 5 shows an illustrative section of recording medium containing recorded signals.

All ten signals (eight from a pulse counter 24 or 25 and two from guide pulse amplifier system 34) can be recorded simultaneously on any one tape and the recording heads can be nested to record straight across the tape or on a diagonal to secure best utilization of the space on the recording medium. Where recording is straight across the tape (not on a diagonal), a representation such as that of storage tape 32 in Fig. 5 might be obtained. By way of example, the period guide pulse occurring every time channel 1 is sampled appears in one row as identified and the channel guide pulse occurring for each channel in the row adjacent thereto. The next eight rows indicate individually the state of each of the eight stages in the counter for the particular count registered. Since there are two possible states for each counter, merely the presence or absence of a magnetized portion of tape is sufficient to indicate the state of a counter, however for improved accuracy, magnetization for both states may be introduced, with opposite polarity magnetization for each state. As will here be noted the marks appearing in the various rows are used to designate one counter state and the spaces to depict the other counter states. The integrated state of all the counter stages indicate in binary digital form the total count achieved by the counter in the interval between the reference pulses and the corresponding intelligence pulses. As will also be here noted the odd channels are recorded in one tape and the even channels, of course, would be recorded in the other tape.

With reference now to Fig. 2 of the drawing a playback unit operative to separate the multiplex information recorded on the storage tapes 32, 33 into individual tabulations is shown. The storage tape containing information relative to alternate channels is indicated by numeral 32. This tape is driven over a group of playback heads 111, one for each signal track, by a suitable drive 112. Playback heads 111 are placed in a geometrical configuration similar to that of recording heads 30, 31. The outputs from the playback heads 111 are separately amplified in a suitable multiple amplifier system 113. The guide pulses are applied to a counter circuit 114 which controls the operation of signal gating amplifiers 115. Through the signal gating amplifiers 115 in accordance with the guide pulse counter output signals are delivered for any selected channel. In playback operation each period guide pulse (Fig. 5) resets the counter circuit 114 to a reference position. Subsequent channel guide pulses advance counter circuit 114 so that after a selected number of channel guide pulses, gates 115 operatively connected and responsive thereto will be open momentarily to permit the transmission of signals from multiple amplifier system 113 regarding one recorded channel. These delivered signals from multiple amplifier system 113 may be applied to a decoder 116. Decoder 116 is any suitable transposing element such as a matrix of resistors or unilateral impedance elements connected as shown in Fig. 7 which will convert the off-on or plus-minus binary signal from signal gating amplifiers 115 into a form usable by a tabulation typewriter 118. In the specific example a teletypewriter, such as the Types 15 or 26A manufactured by The Teletype Corporation could be used at 118.

A resistance matrix or decoder suitable for transposing information from a binary system to a decimal system is shown in Fig. 7. Although this particular matrix showing binary combinations sufficient for only one decimal digit would not be suitable for use in the invention as thus far described which employs three decimal digits, it is adequate to illustrate the principles of decoding as required for the invention.

In Fig. 7, the binary digits are contained as states of trigger circuits, one for each binary digit in the representation of a decimal digit. Trigger circuits are conveniently used in binary systems because their two conductivity states can represent the two possible binary digit values. Since each trigger circuit alone can indicate two conditions only it is necessary to employ four trigger circuits to give sufficient conductivity combinations (multiples of two) to represent the ten values of a decimal digit.

The trigger circuits are typified by that having the triode tubes 140–A, 140–B. The other trigger circuits are indicated by the numerals 141–A, 141–B, 142–A, 142–B, 143–A, 143–B. The trigger circuit of tubes 140–A, 140–B as shown will be stable in either of two conductivity states, with the anode of one tube at a high potential while the anode of the other is at a low potential. The trigger circuit can be brought to a condition indicating one value of a binary digit by a signal applied to one tube or one tube anode and to a condition indicating the opposite value of the binary digit by the application of a signal to the opposite grid or anode. Such trigger circuits and the methods of triggering thereof are well known in the prior art. Thus the trigger circuits can be brought to a conductivity condition representative of each binary digit corresponding to the value of the decimal digit. For illustration, the values of the decimal digit may be given by a series of neon glow tubes 144, ten in number, each labeled with a value from zero to nine. Only one neon glow tube, that corresponding to a decimal value given by the binary combinations will be lighted at one time.

Each neon glow tube is connected to a potential source and to a different combination of the anodes of the trigger circuit tubes and that neon glow tube will be conductive only when the trigger circuit anodes connected thereto are all at a low potential. Thus to represent the decimal numeral value 5, for example, tubes 140–A, 141–B, 142–A and 143–B would be of necessity conductive because those tubes are connected to tube 144–F. It remains then only to place the trigger circuits of which the tubes 140–A, 141–B, 142–A and 143–B are components in such a conductive condition as by the trigger input signals such as would be obtained from gating amplifiers 115.

In practice therefore, the manner of constructing a matrix of this type would be in just the reverse of the foregoing discussion. Connections of the signal gating amplifiers 115 would be made to the trigger circuits so that operation of the trigger circuits would occur in response to played back signals to indicate the binary digital value of a decimal digit. When the played back signals are intended to represent the binary combinations of a typical decimal numeral zero (0), for example, the trigger circuits will be placed with tubes 140–B, 141–A, 142–A, 143–A conductive. It remains then to connect the anodes of these tubes through limiting resistances such as 145–A, 145–B, 145–C, and 145–D to the zero indicator neon glow tube 144–A. For the connections of the one (1) numeral indicator neon glow tube 144–B examination will show that to indicate the numeral, the signals from signal gating amplifiers 115 will place the trigger circuits in conditions with tubes 140–A, 141–B, 142–B and 143–B conductive. Connections of neon glow tube 144–B will therefore be made to these anodes. This same procedure is followed throughout and would apply to more complicated matrixes such as would employ a possible 200 neon tubes and eight trigger circuits. To reduce interaction where many trigger circuits would be tied together with so many elements, it may be desirable to employ unilateral impedance elements such as crystal diodes in place of the limiting resistances typified by 145–A, 145–B, 145–C and 145–D.

With the counter circuit 114 of Fig. 2 and signal gating amplifiers 115 it is possible to adjust counter circuit 114 to typically select individually channel 1, 3, 5, or 7, each time that selected channel comes past the playback heads 111 to produce binary coded output signals that will be tabulated by tabulation typewriter 118. The tape is run through the playback heads 111 as many times as there are channels recorded thereon, namely, four, to produce four separate and distinct tabulations. Although teletypewriter tabulation is shown, automatic tape punching equipment could be easily substituted provided the appropriate transposition device or decoder 116 is incorporated. Such tape punching may be desirable for the insertion of data into automatic calculation equipment. Similarly the decoder 116 could directly provide information for electronic insertion into high speed automatic calculation equipment.

In general the playback speed will be limited by the maximum speed at which the typewriter or other auxiliary equipment will operate. The typewriter will operate at rates as high as ten decimal digits per second. At such a rate for the typical case, tabulation would require about five hours for every second of data in each channel. For many applications it would be sufficient to tabulate only for occasional readings such as every 500th or 1,000th sampling of each channel. The counter 114 also contains additional counting equipment and may be preset to produce such tabulations.

The foregoing discussion of the apparatus of the invention has been directed primarily for operation with an information containing waveform such as that shown by waveform "A" of Fig. 3 in which the intelligence conveying pulses for each channel are individually subjected to time-positional variation with respect to time reference pulses. In such a system, a given channel intelligence conveying pulse will always occur within a specified range of time relationship or delay referred to the master pulse. In the typical illustration this time range is 100 microseconds. The first 100 microseconds after the master pulse remains blank. The second 100 microsecond period is allotted to channel 1, the third 100 microsecond period to channel 2 and so on.

With slight modification of the basic apparatus as thus far described, operation with a second type of information containing waveform is possible. This second type provides a multiple pulse information conveying waveform such as that shown in Fig. 4. In this waveform, a first master pulse 210 is transmitted followed by a series of intelligence pulses. Again time positional variation of the intelligence pulses is made the basis for intelligence transmission, however, the first intelligence pulse is modulated in time occurrence with respect to the master pulse to provide the first channel, the second intelligence pulse is modulated in time occurrence with respect to the first intelligence pulse to provide the second channel and so forth. With this type of signal, the position of the second intelligence pulse will vary in accordance with the intelligence in both channels 1 and 2. The master pulses are provided with suitable distinguishing characteristics such as of duration or inspacing with respect to the maximum position of the last intelligence pulses of a preceding series so that it is readily possible to separate them.

For operation with a waveform of this type, the mechanical switches shown in Fig. 1 must be operated in accordance with the following schedule:

Switch 37 thrown to deliver the intelligence pulses from master pulse separation unit 14 to the switch 21 to cause the trigger action thereof.

Switch 38 open rendering time base unit 15 inoperative.

Switch 39 closed to deliver counter pulses to terminal 20 continually.

Switches 39–A closed to deliver all intelligence pulses to guide pulse amplifier system 34 for simultaneous recording on storage tapes 32 and 33 as channel guide pulses.

Switches 39–B closed to deliver all master pulses guide pulse amplifier system 34 for simultaneous recording on storage tapes 32 and 33 as period guide pulses.

In this new setup, master pulses will not be delivered to the time base unit 15 so that reference pulses, which are no longer needed, are not produced. As before switch 21 will be brought to a reference condition by each master pulse, after which it will operate back and forth from one condition to another in response to intelligence pulses operating the gated amplifiers 22 and 23 alternately. The closure of switch 39 delivers counter pulses continually to terminal 20. It is of interest to note that with this simplified connection every receiver output pulse, masters included, will produce a signal which will be recorded. The first information recorded subsequent to the occurrence of a master pulse will be relative to the spacing between the previous intelligence pulse and the master pulse and will be meaningless, however this spacing information can be put to very good use. As previously mentioned, a basis for the identification of master pulses can be the duration of time separating them from a preceding signal. If such basis were selected, the time duration of this minimum spacing or "dead" period can be set somewhat longer than the maximum spacing between individual intelligence pulses. Thus in the operation of the apparatus of Fig. 1, one of the counters would be counting in this "dead" period. It has been previously mentioned that the eight stage pulse counters employed at 24, 25 are capable of counting up to 255 (over 125 microseconds) however only 200 counts are required for 100 microseconds. It is therefore a simple matter to derive an output signal from the counters whenever the count exceeds 200, say 225, which will identify the next following pulse as a "master" pulse. To this end the master pulse seperation unit 14 would receive identifying signals from the appropriate one of pulse counters 24, 25.

The minimum time spacing of succedent pulses which this signal will record is limited in general by two factors. The first is that imposed by the waveform itself because the two adjacent pulses cannot be placed so close that they will overlap. The second limitation is in the system and is imposed by the time required for the "read-out," of the information contained within the counter circuits and the subsequent resetting of the counter to its reference position. Furthermore in certain applications it may be desirable to delay the read-out signals delivered to the output circuits 26, 27 to allow additional time for the counters to reach stable states before "read-out" occurs.

Figure 4:
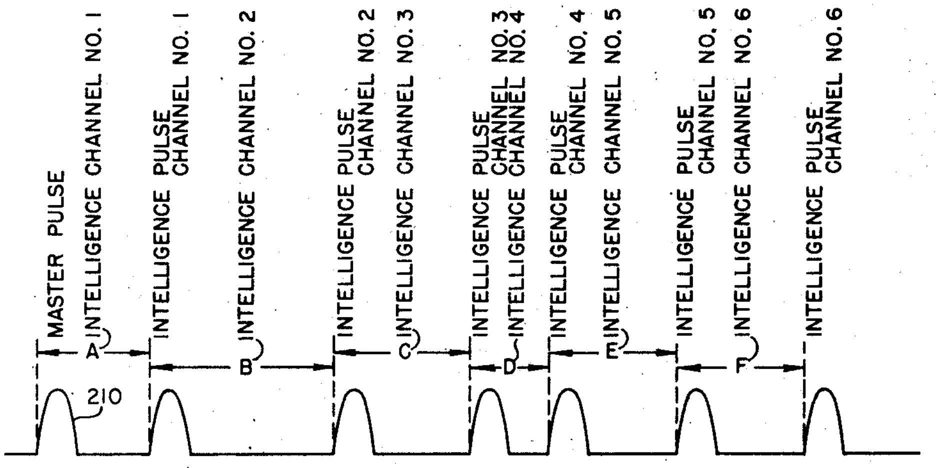

The recording made on the tape will be somewhat different with operation on the signal of Fig. 4 as compared to that made with the signal of Fig. 3 because the channel guide pulses and hence the counter state signals will not be uniformly spaced in time in the direction of travel of the tape and because all channel guide (intelligence) pulses appear on each tape. This may offer difficulties particularly where many of the intelligence pulses follow closely the corresponding master pulse because there will be a "bunching together" of some of the readings. In general a higher tape speed will thus be required so that adequate resolution of the recorded signals may be made. The alternative to this is to employ storage circuits which will store the information as received and deliver it in a regular, uniform manner for recording. This additional complexity would be well within the scope of the present invention but for a practical manner in most applications it would be better simply to increase the tape speed.

Figure 6A:
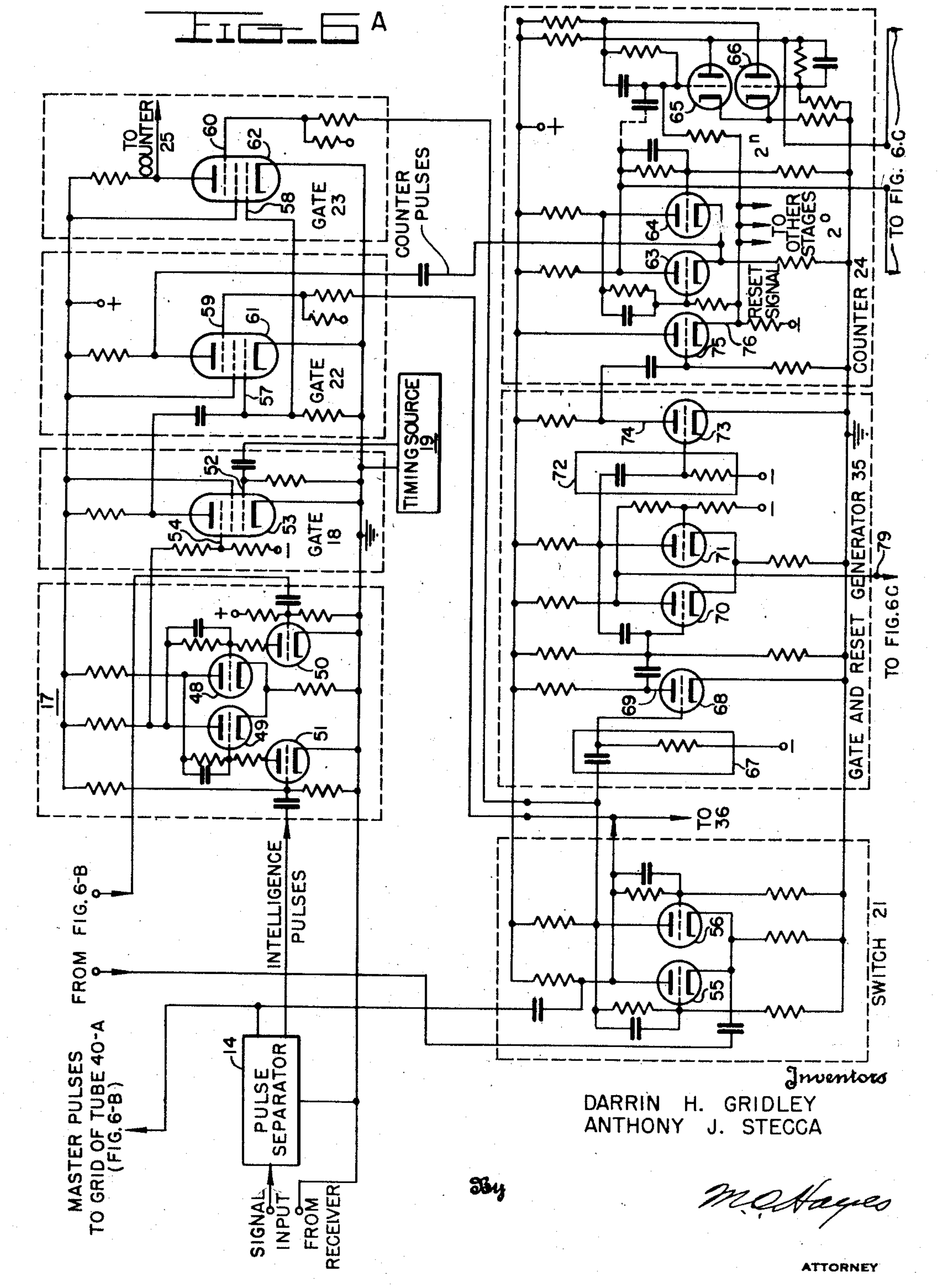
Figure 7:
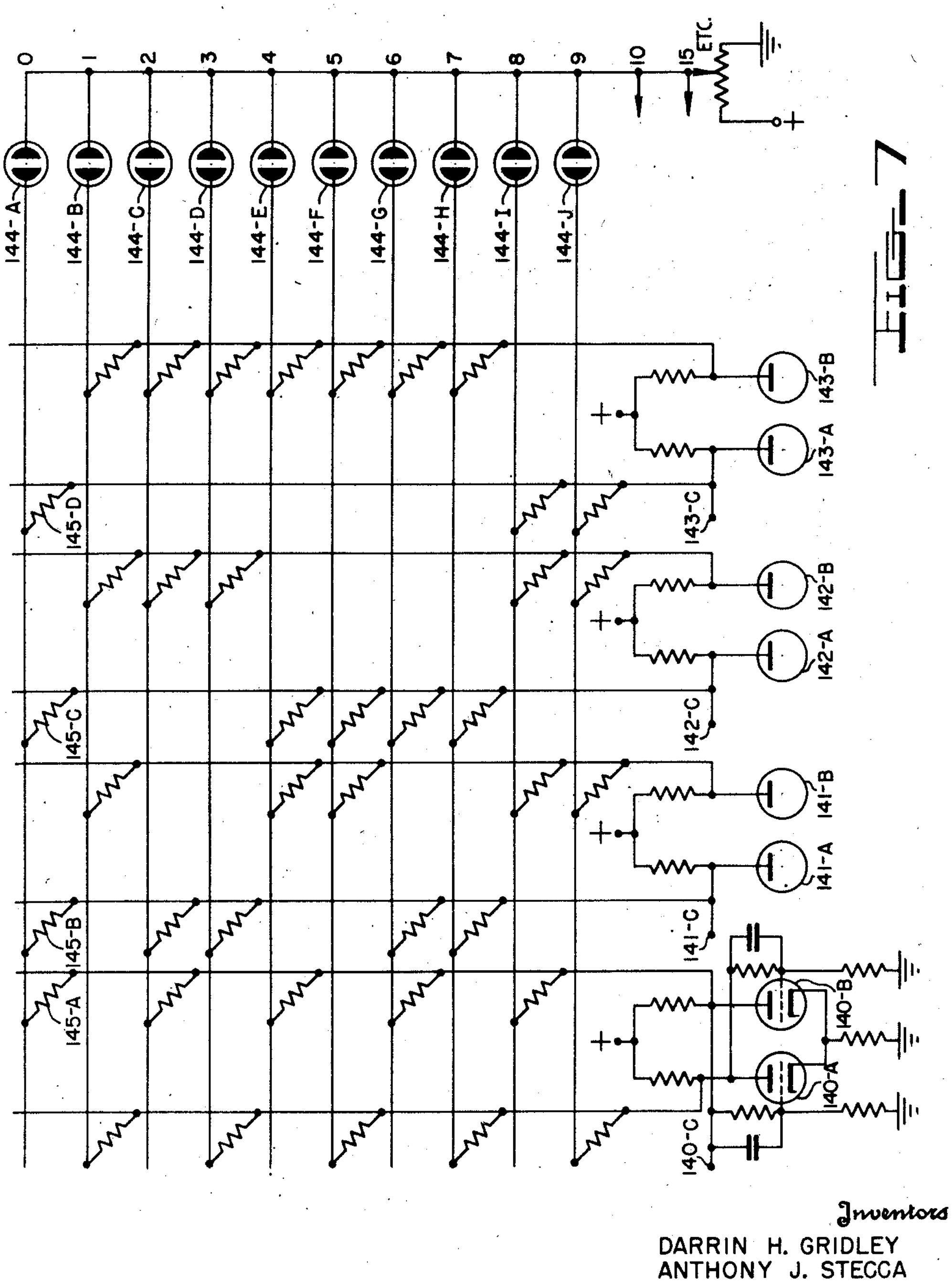
Fig. 7 shows a typical resistance matrix digital transposing circuit.

For further detailed explanation of the basic apparatus reference is now made to Figs. 6–A, 6–B, 6–C which show a schematic diagram, appearing on three sheets of the drawings, of details of particular components of the apparatus of Fig. 1 as connected for operation with an input signal of the first described type as shown in the waveform of Fig. 3. Reference numbers previously given correspond to similar numerals appearing on Figs. 6–A, 6–B and 6–C.

Following the signal path through the circuit, receiver output signals are supplied to the master pulse separation unit 14 in Fig. 6–A. The master pulse signals, or pulses produced in response thereto are applied to the time base unit 15 shown in Fig. 6–B. As here shown the time base unit 15 comprises a series of unstable multivibrators connected in cascade.

Signals produced by the cascade connected trigger circuits of time unit 15 (Fig. 6–B) are combined in such a manner as to control the operation of the entire apparatus. Operating signals from the trigger circuits are negative in polarity obtained when the right hand tubes such as 40–B and 41–B begin conduction. For isolating purposes, uni-lateral impedance elements are employed in the output circuits from the trigger circuits. In many instances the output circuits may be modified so that simple bilateral coupling elements may be used. Furthermore considerable simplification of the entire time base unit 15 (Fig. 6–B) from that shown can be effected in many instances, however, to indicate more fully and distinctly the characteristics of control signals employed in the system and their relationships one to the other, an elaborate time base unit has been shown.

The trigger circuits shown in Fig. 6–B are all of the one-shot multivibrator type having one stable conductivity state but capable of existing for a selected interval of time in a second unstable state. In the original condition existing without input signals, all of the left hand sections of the trigger circuits (such as tubes 40–A and 41–A) are conductive. The application of a negative (master) pulse to the grid of tube 40–A reverses this conductivity condition to produce a positive signal at the anode of the left hand tube (40–A). This positive signal is applied to the grid of tube 41–A and since this tube is conductive anyway, tubes 41–A and 41–B are not affected. The negative signal produced simultaneously at the anode of tube 40–B is applied through a uni-lateral impedance element 43–A to guide pulse amplifier system 34 where it is amplified and delivered to one of recording heads 30 for recording on storage tape 32 as a period guide pulse. This pulse appears practically coincident with the master pulse.

When the trigger circuit of tubes 40–A, 40–B reverts to its stable state after a period of time determined in part by the time constants of the grid circuit of tube 40–A, the return to conduction of tube 40–A produces a negative signal at the anode thereof which, when communicated to the grid of tube 41–A, causes the trigger circuit of tubes 41–A, 41–B to achieve the unstable state producing a negative pulse at the anode of tube 41–B. This negative pulse is delivered in several paths to the other components of the apparatus. A first path is through uni-lateral impedance element 43–B to guide pulse amplifier system 34 for delivery to recording heads 31 where it is recorded as a period guide pulse on storage tape 33. A second path is through uni-lateral impedance element 43–C to the grid of input keying tube 50 in switch 17 (Fig. 6–A) to initiate the delivery of counter pulses, Fig. 1, to terminal 20.

Again after delay introduced by the time constants in the grid circuit of tube 41–A, a negative pulse is delivered to a subsequent trigger circuit having two tubes 42–A. This sequential operation continues on down the chain of trigger circuits so that reference pulses are generated every 100 microseconds in the typical case. As previously described and shown by waveform B of Fig. 3 the operation of the trigger circuit of tubes 40–A, 40–B also produces typically 100 microseconds time lag before channel 1 reference pulse is produced, however since intelligence is not transmitted in that period, the duration thereof can be shortened if desired, to an exemplary 25 microseconds.

The negative pulse produced with 100 microseconds delay by the trigger circuit of tubes 42–A is delivered in several signal paths. A first path is serially through uni-lateral impedance elements 43–D and 43–E to the grid of input keying tube 50, Fig. 6–A. A second path is serially through uni-lateral impedance elements 43–D and 43–F to the cathodes of tubes 55, 56 in switch 21 for counter circuit readout and subsequent reset. A third path is through uni-lateral impedance element 43–G to guide pulse amplifier system 34 for recording on storage tape 32 as a channel guide pulse for channel 1.

Similar action takes place resultant to the production of a delayed negative pulse by the trigger circuit of tubes 42–B, with signals therefrom being delivered to the grid of input keying tube 50, the cathode of tubes 55, 56, and to guide pulse amplifier system 34 for recording on storage tape 33 as a channel guide pulse for channel 2.

This same action continues down the chain differing only when a negative signal is produced by the last trigger circuit of tubes 42–H. This signal is delivered through uni-lateral impedance element 43–H to the cathodes of tubes 55, 56 for counter read-out and reset, and through uni-lateral impedance element 43–I to guide pulse amplifier system 34 for recording as a channel guide pulse for channel 8. This reference signal is not delivered to the grid of input keying tube 50 as for previous signals because in this system it is not desirable that counter pulses be delivered to one of the counters in the interval between readout for channel 8 and the occurrence of a succedent input pulse signal.

With the signals produced by time base unit 15 and their time relationship thus described, the description of the rest of the schematics of Figs. 6–A, 6–B and 6–C will be given in considerable detail.

The switch 17 (Fig. 6–A) is a trigger circuit including tubes 48, 49 and possesses two stable states. Tubes 48, 49, are provided with input keying tubes 50, 51 which receive reference pulses from time base unit 15 and intelligence pulses from master pulse separation unit 14 respectively. In operation, input keying tubes 50, 51 are normally conductive, however a negative reference pulse supplied to the grid of input keying tube 50 interrupts the flow of current in the input keying tube 50 raising the potential of the grid of tube 48 so that the trigger circuit is placed in a condition with tube 48 conductive. The next negative polarity intelligence pulse supplied to the grid of input keying tube 51 reverses this condition of the trigger circuit rendering tube 49 conductive.

Timing source 19 produces a series of accurately spaced positive pulses of short duration which are applied to a control grid 52 of tube 53 in gated amplifier circuit 18. A second control grid 54 of tube 53 receives the signal from the anode of tube 49. Hence, following the application of a reference pulse causing conduction in tube 48, the resulting positive voltage at the anode of tube 49 raises the potential at the second control grid 54. By proper selection of the circuit constants and the supply voltages, this higher potential will unblock the tube at the second control grid 54 permitting conductivity by the anode circuit of tube 53 in response to the pulses supplied to control grid 52. As tube 49 again becomes conductive following the application of an intelligence pulse to input keying tube 51, the second control grid 54 again blocks tube 53 terminating the conductivity period for tube 53.

The negative timer pulses produced at the anode of tube 53 in the time interval between input reference and intelligence pulses are supplied in parallel to gated amplifiers 22 and 23 which are controlled for alternate operation by switch 21.

Each master pulse from master pulse separation unit 14 resets switch 21, comprising the tubes 55, 56 connected in a trigger circuit having two stable states, placing switch 21 in a basic condition with tube 55 conductive. The trigger circuit has a common cathode juncture and to this point is delivered reference signals from time base unit 15. The reference pulses are of negative polarity and serve to drop the potential at the cathode juncture point of the trigger circuit so that the non-conductive tube is rendered conductive. Each master pulse from master pulse separation unit 14 places switch 21 in a reference position and after that, switch 21 operates back and forth from one conductivity condition to the other in response to reference pulses from time base unit 15. Actually the condition opposite to the basic condition will prevail after the first reference pulse, the basic condition will prevail after the second reference pulse and so on.

Gated amplifiers 22 and 23 include combining or gating circuits having multi-grid type tubes. The pulses from the anode of tube 53 are supplied to the grids 57, 58 in parallel while the grids 59, 60 are connected to alternate plates of the tubes 55, 56 in switch 21. Grids 57, 58 are provided with nominally zero bias condition in the absence of signals from tube 53 however, the anode circuits are rendered conductive by virtue of the connection of grids 59, 60 to opposing anodes of tubes 55, 56. In the presence of signals from tube 53, anode circuit conduction is interrupted periodically in the tubes 61, 62 producing a series of signals at the appropriate anode as controlled by gated amplifier circuit 18.

Signals from the anodes of tubes 61 and 62 go to separate counter circuits. By way of illustration, Fig. 6–A shows the connection of the anode of tube 61 to a pulse counter 24. Connections of the anode of tube 62 to pulse counter 25 and the pulse counter 25 itself, although not shown, would be similar. Pulse counter 24 is composed of a series of cascade connected trigger circuits each possessing two stable states. For the total count of 200, eight stages are required in the counter. To avoid undue complexity only the first and the last stages, $2^0$ and $2^n$ having tubes 63, 64 and 65, 66, respectively are shown. To insure that all stages of the counters are in a known reference condition at the start of each count, all stages are simultaneously supplied with a reset signal. The reset signal for pulse counter 24 is produced by gate and reset pulse generator 35 in response to a signal from switch 21 in the following manner. The positive potential produced at the anode of tube 56 in switch 21 upon the occurrence of each even numbered reference pulse supplied to the common cathode connection of tubes 55, 56 is communicated via a differentiator network 67 to the grid of a normally non-conductive tube 68 producing a negative pulse at anode 69. Tubes 70, 71 form a trigger circuit of the one shot multivibrator type having one stable state in which tube 70 is conductive. Tube 70 ceases conduction in response to the negative pulse at anode 69 and remains in that condition for a period of time determined in part by the components in its grid circuit. When tube 70 returns to conduction, tube 71 is cut off producing a rising voltage at the anode thereof which is communicated through a differentiator type network 72 to the grid of a normally non-conductive tube 73 producing a negative pulse signal at anode 74. The negative signal at the anode of tube 74 is supplied to the counter circuit reset tube 75 which is normally conductive with cathode 76 near ground potential. A negative signal is thereby produced at the cathode 76 and supplied in parallel to the first tube of all stages of the counter placing each in a reference position with the first tube corresponding to tubes 63 and 65 non-conductive. Gate and reset pulse generator 36 would of course be connected to the anode of tube 55 in switch 21.

With the stages in pulse counter 24 thus set up by an even numbered reference pulse or by a master pulse when necessary, a succeeding negative reference pulse supplied to the common cathode connection of tubes 55, 56 will bring tube 56 to conduction producing an elevated potential at the anode of tube 55. This elevated potential raises the grid 59 of tube 61 at the same time that the corresponding reference pulse operates switch 17 and gated amplifier circuit 18 to initiate the delivery of timing pulses from timing source 19 to tube 61 and thence to the common cathode connection of tubes 63, 64. The various interconnected stages of pulse counter 24 then count in order attaining different combinations of conductivity conditions as the counter pulses occur. Termination of the delivery of counter pulses is brought about when the intelligence pulse delivered to input keying tube 51 reverses the condition of switch 17, blocking gated amplifier circuit 18 to further signal delivery. Subsequently the counter stages in pulse counter 24 remain in the last combination of conductivity conditions attained holding the information thus derived. The derived information is transferred simultaneously from all counter stages through gated amplifier stages 77, 78 (for the first and last stages) in Fig. 6–C to the recording amplifiers 28 upon the occurrence of the succeeding reference pulse which operates switch 21, tube 68 and the trigger circuit of tubes 70, 71 as previously described producing a positive signal at terminal 79. Almost immediately then, only after delay caused by the operation of the trigger circuit of tubes 70—71 to allow sufficient time for the gated amplifier stages 77, 78 to "read out," responsive to a signal from the anode of tube 70, the conditions of the counter stages, and for the recording to occur, a reset signal is produced at the anode of tube 71. This signal is communicated through the differentiator network 72 to counter circuit reset tube 75 placing the counter in condition for counting again.

Although certain specific embodiments of this invention have been disclosed and described, it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. Means for indicating in binary form the time interval between successive time variational signal pulses which comprises, a signal source of standard frequency, a pair of binary counters, a commutating switch circuit connecting said signal source to said counters, and means operating said switch circuit in response to successive input signal pulses to feed the signals from said signal source in sequential alternation to said counters.

2. Means for indicating in binary form the time interval between successive time variational signal pulses which comprises, a signal source of standard frequency, a pair of binary counters, a commutating switch circuit connecting said signal source to said counters, means operating said switch circuit in response to successive input signal pulses to feed the signals from said signal source in sequential alternation to said counters, and means for storing the signal count achieved by said counters.

3. Apparatus for handling multiplex information relative to a plurality of variable quantities comprising means supplying information relative to the variable quantities as time positional variation of successive pulse signal portions of emitted signal waveforms, receiver means for intercepting and amplifying emitted signal waveforms, generator means responsive to the output of the receiver means for producing a variable number of timing pulses in dependency on the signal waveform, counting means determining the number of timing pulses produced relative to each quantity, and means storing individually in binary form the number of timing pulses registered by the counting means for each quantity.

4. Apparatus for handling multiplex information relative to a plurality of variable quantities comprising means supplying information relative to the variable quantities as time positional variation of successive pulse signal portions of emitted signal waveforms, receiver means for intercepting and amplifying emitted signal waveforms, generator means responsive to the output of the receiver means for producing a variable number of timing pulses in dependency on the signal waveform, first counting means determining the number of timing pulses produced relative to each quantity, means storing individually in binary form the number of timing pulses registered by said first counting means for each quantity, translation means sequentially producing pulse groups from said storing means for each quantity stored, a second counting means counting the pulse groups and producing a gating pulse in response to a selected count, and gating means responsive to said gating pulse and said pulse groups for passing pulse groups representing a selected quantity.

5. Apparatus for handling multiplex information relative to a plurality of variable quantities in which the information is contained as time positional variation of successive signal portions of input signal waveforms comprising, means producing a variable number of timing pulses in dependency on the signal waveform, first and second counters responsive to timing pulses for alternate time intervals in dependency on the successive portions of the input signal waveform, and means storing in binary form the number of timing signals registered by each counter for each time interval.

6. Apparatus for handling multiplex information relative to a plurality of variable quantities in which the information is contained as time positional variation of successive signal portions of input signal waveforms comprising, means producing a series of reference signals in response to selected portions of the input signal waveform, generator means producing a variable number of timing signals for each quantity in dependency on the time spacing between a reference signal and the portion of the input signal waveform for a quantity corresponding thereto, counting means determining the number of timing signals produced relative to each sampling of each quantity, and means storing in binary form the quantity of timing signals registered by the counting means for each time interval.

7. Apparatus for handling multiplex information relative to a plurality of variable quantities in which the information is contained as time positional variation of successive portions of input signal waveforms comprising, means producing a series of reference signals in response to selected portions of the input signal waveform, generator means producing a variable number of timing signals for each quantity in dependency on the time spacing between a reference signal and the portion of the input signal waveform for a quantity corresponding thereto, first and second counters responsive to timing signals for alternate time intervals in dependency on the successive portions of the input signal waveforms, and means storing in binary form the quantity of timing signals registered by each counter for each time interval.

8. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, generator means delivering a series of timing signals in the interval of time between each reference signal and a succeeding intelligence conveying pulse signal, counting means determining the number of timing signals produced in the time interval for each quantity, and means storing in binary form the number of timing signals registered for each quantity by the counting means.

9. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, a timing signal generator producing a continuous pulse type timing signal having an accurately controlled frequency, an electronic switch operative in response to reference signals and intelligence signals to produce a gating signal of selected characteristics in the time interval between a reference pulse and a succedent intelligence conveying pulse, a gating amplifier responsive to the gating signal and the timing signals to selectively deliver timing signals in the interval between a reference pulse and a succedent intelligence conveying pulse, counting means determining the number of timing signals produced in the time interval for each quantity, and means storing in binary form the number of timing signals registered for each quantity by the counting means.

10. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, a timing signal generator producing a continuous pulse type timing signal having an accurately controlled frequency, an electronic switch operative in response to reference signals and intelligence signals to produce a gating signal of selected characteristics in the time interval between a reference pulse and a succedent intelligence conveying pulse, a gating amplifier responsive to the gating signal and the timing signals to selectively deliver timing signals in the interval between a reference pulse and a succedent intelligence conveying pulse, first and second counters responsive to timing signals for alternate time intervals in dependency on the successive portions of the input signal waveforms, and means storing in binary form the quantity of timing signals registered by each counter for each time interval.

11. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, a timing signal generator producing a continuous pulse type timing signal having an accurately controlled frequency, an electronic switch operative in response to reference signals and intelligence signals to produce a gating signal of selected characteristics in the time interval between a reference pulse and a succedent intelligence conveying pulse, a gating amplifier responsive to the gating signal and the timing signals to selectively deliver timing signals in the interval between a reference pulse and a succedent intelligence conveying pulse, first and second counters responsive to timing signals for alternate time intervals in dependency on the successive portions of the input signal waveforms, signal amplifier means responsive to the reference signals and to master signals to provide identifying signals for establishing the identity of the timing signals derived in the recurrent successive time intervals, and means storing in binary form the quantity of timing signals registered by each counter for each time interval together with the identifying signals.

12. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, a timing signal generator producing a continuous pulse type timing signal having an accurately controlled frequency, an electronic switch operative in response to reference signals and intelligence signals to produce a gating signal of selected characteristics in the time interval between a reference pulse and a succedent intelligence conveying pulse, a gating amplifier responsive to the gating signal and the timing signals to selectively deliver timing signals in the interval between a reference pulse and a succedent intelligence conveying pulse, first and second counters responsive to timing signals, an electronic switching apparatus operative to deliver the timing signals produced in the time interval between a first reference pulse and a first intelligence pulse following each master pulse and succeeding alternate time intervals of a similar character to the first counter and to deliver the timing signals produced in the time interval between a second reference pulse and a second intelligence pulse following each master pulse and succeeding alternate time intervals of similar character to the second counter, signal amplifier means responsive to the reference signals and to master signals to provide identifying signals for establishing the identity of the timing signals derived in the recurrent successive time intervals, and means storing in binary form the quantity of timing signals registered by each counter for each time interval together with the identifying signals.

13. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a reference signal generator producing in response to each master signal a series of reference signals placed at known time relationship therewith, a timing signal generator producing a continuous pulse type timing signal having an accurately controlled frequency, an electronic switch operative in response to reference signals and intelligence signals to produce a gating signal of selected characteristics in the time interval between a reference pulse and a succedent intelligence conveying pulse, a gating amplifier responsive to the gating signal and the timing signals to selectively deliver timing signals in the interval between a reference pulse and a succedent intelligence conveying pulse, first and second binary counting trigger circuits providing conductivity combinations sufficient to register the maximum possible number of timing signals allotted to the measurement of the time intervals between reference and intelligence pulses, means deriving state signals regarding the number of timing signals counted by each counter relative to the duration of a preceding interval of time between a preceding reference signal and a preceding intelligence signal upon the occurrence of a succeeding reference pulse, means resetting each counter to a reference combination of states a selected interval of time after the delivery of state signals, signal amplifier means responsive to the reference signals and to master signals to provide identifying signals for establishing the identity of the state signals derived in the recurrent successive time intervals, and means storing in binary form the quantity of timing signals registered by each counter for each time interval together with the identifying signals.

14. Apparatus for handling multiplex recurrent information relative to a plurality of variable quantities in which the information is contained as recurrent successive time interval variation of successive intelligence conveying signals with respect to recurrent master signals associated therewith comprising, a signal discriminator for identifying master signals, a timing signal generator producing a continuous pulse type timing signal having an accurately controlled frequency, an electronic switch apparatus operative in response to intelligence signals to deliver in two paths alternately timing signals in the time intervals between succedent intelligence signals, first and second binary counting trigger circuits responsive separately to timing signals from the last named apparatus providing conductivity combinations sufficient to register for alternate time intervals the maximum possible number of timing signals allotted to the measurement of the time intervals between successive intelligence signals, means deriving at the termination of a time interval between two intelligence signals state signals regarding the number of timing signals counted by each counter in the time interval, means resetting each counter to a reference combination of states a selected interval of time after the delivery of state signals, signal amplifier means responsive to the intelligence signals and to master signals to provide identifying signals for establishing the identity of the state signals derived in the recurrent successive time intervals, and means storing in binary form the quantity of timing signals registered by each counter for each time interval together with the identifying signals.

15. Apparatus for reproducing a selected plurality of information item notations recorded on a strip and belonging to a selected one of a set of similar multiplexed information item channels, each channel corresponding with a separate set of notation positions on said strip, the individual members of each notation position set being spaced along said strip to form periodically recurring, similarly ordered sequences formed from one member from each notation position set, said apparatus comprising in combination, translation means for translating said recorded notations into electrical signals, means for individually scanning with said translation means said notations in order of apposition on the strip, normally blocked signal transfer means coupled between an output and said translation means, and means adjustable to a selected channel for unblocking momentarily said signal transfer means coincident with each scanning of a notation of the selected channel.

16. Apparatus for reproducing a selected plurality of information items recorded on a strip and belonging to a selected one of a set of similar multiplexed information item channels, each channel corresponding with a separate set of notation positions on said strip, the individual members of each notation position set being spaced along said strip to form periodically recurring, similarly ordered sequences formed from one member from each notation position set, said apparatus comprising in combination, means for translating said recorded notations into electrical signals, means for individually scanning with said translation means said notations in order of apposition on the strip, normally blocked signal transfer means coupled between an output and said translation means, means for counting in each recurrence period the number of notations scanned by said translation means from the beginning of the period, means actuated by the registry upon said counting means of a selected count denoting the selected channel to unblock momentarily all of said signal transfer stages, and means for resetting said counting means upon the termination of each period.

17. Apparatus for transliterating a selected plurality of information items initially denoted by recorded transverse groups of binary code marks in a grid arrangement of rows across and paths along a recording strip, said plurality of information items belonging to a selected one of a set of multiplexed information item channels, each channel corresponding with a separate set of rows upon said strip, the individual members of each row set being spaced along said strip to form periodically recurring, similarly ordered sequences formed from one member from each row set, said apparatus comprising in combination, a pick-up head including a plurality of pick-up units matched in number to and each registering with one of said grid arrangement paths, said pick-up units being arrayed to form a line in parallel with said grid arrangement rows, means for moving said strip past said pick-up head, a plurality of signal transfer stages matched in number to and each coupled to one of said pick-up units registering with the binary code mark paths, a binary counter coupled to the channel mark pick-up unit for identifying the selected channel, means actuated by the registry upon said counter of a selected count denoting the selected channel to unblock momentarily all of said signal transfer stages, means coupled to the period mark pick-up unit for resetting said counter, and a matrix circuit coupled to the outputs of the signal transfer unit for converting arrays of output signals thereon into decimal form notations of the selected channel information items.

DARRIN H. GRIDLEY.
ANTHONY J. STECCA.

References Cited in the file of this patent

UNITED STATES PATENTS

| Number | Name | Date |
|---|---|---|
| 2,405,597 | Miller | Aug. 13, 1946 |
| 2,468,703 | Hammel | Apr. 26, 1949 |

FOREIGN PATENTS

| Number | Country | Date |
|---|---|---|
| 355,705 | Great Britain | Aug. 24, 1931 |